US007142883B2

(12) United States Patent  
Rouse et al.

(10) Patent No.: US 7,142,883 B2
(45) Date of Patent: Nov. 28, 2006

(54) SYSTEM AND METHOD FOR PROVIDING SEARCH CAPABILITIES AND STORING FUNCTIONS ON A WIRELESS ACCESS DEVICE

(75) Inventors: Andrew Rouse, Andover, MA (US); Quinton Zondervan, Boston, MA (US); Thomas Bentley, North Chelmsford, MA (US); Timothy Lawson, Stow, MA (US); Christopher Herot, Newton Highlands, MA (US)

(73) Assignee: International Business Machines Corporation, Armonk, NY (US)

( * ) Notice: Subject to any disclaimer, the term of this patent is extended or adjusted under 35 U.S.C. 154(b) by 872 days.

(21) Appl. No.: 09/885,139

(22) Filed: Jun. 20, 2001

(65) Prior Publication Data

US 2002/0087627 A1    Jul. 4, 2002

Related U.S. Application Data

(63) Continuation-in-part of application No. 09/750,301, filed on Dec. 29, 2000, and a continuation-in-part of application No. 09/750,320, filed on Dec. 29, 2000.

(51) Int. Cl.
*H04M 1/00* (2006.01)
(52) U.S. Cl. .............................. 455/552.1; 455/556.1; 709/232; 709/246
(58) Field of Classification Search ............ 455/552.1, 455/556.1, 556.2, 557, 414.1
See application file for complete search history.

(56) References Cited

U.S. PATENT DOCUMENTS

| | | | |
|---|---|---|---|
| 5,590,178 A | 12/1996 | Murakami et al. ........... 379/96 |
| 5,727,950 A | 3/1998 | Cook et al. .................. 434/350 |
| 5,732,074 A | 3/1998 | Spaur et al. | |
| 5,742,668 A | 4/1998 | Pepe et al. .................... 379/58 |
| 5,742,905 A | 4/1998 | Pepe et al. | |
| 5,758,293 A | 5/1998 | Fraiser | |
| 5,790,974 A | 8/1998 | Tognazzini | |
| 5,793,762 A | 8/1998 | Penners et al. | |
| 5,796,728 A | 8/1998 | Rondeau et al. | |
| 5,873,045 A | 2/1999 | Lee et al. | |
| 5,896,369 A | 4/1999 | Warsta et al. | |
| 5,918,158 A | 6/1999 | LaPorta et al. | |
| 5,920,826 A | 7/1999 | Metso et al. ................. 455/557 |
| 5,933,778 A | 8/1999 | Buhrmann et al. ......... 455/461 |

(Continued)

FOREIGN PATENT DOCUMENTS

EP        0 785 661 A2      7/1997

(Continued)

OTHER PUBLICATIONS

U.S. Appl. No. 09/750,301, filed Dec. 29, 2000, Rouse et al.

(Continued)

*Primary Examiner*—Temica Beamer
(74) *Attorney, Agent, or Firm*—Pillsbury Winthrop Shaw Pittman, LLP

(57) ABSTRACT

A system and method for enabling users to send and receive messages and other information from mobile devices and enabling users to access server-based information using mobile devices over wireless data networks are disclosed. The system and method further provides search capabilities on a wireless device. The system and method may further provide storing capabilities wherein search data and other user input and preferences may be stored in a file associated with the wireless client device. The storing capabilities may facilitate searching techniques. In addition, the storing capabilities may retain user selected preferences, views and other information for future wireless access.

28 Claims, 11 Drawing Sheets

U.S. PATENT DOCUMENTS

| | | | |
|---|---|---|---|
| 5,943,616 A | 8/1999 | Andersson | |
| 5,944,787 A | 8/1999 | Zoken | 709/206 |
| 5,949,326 A | 9/1999 | Wicks et al. | |
| 5,978,685 A | 11/1999 | Laiho | |
| 5,983,073 A | 11/1999 | Ditzik | |
| 5,987,029 A | 11/1999 | Kotani et al. | |
| 6,009,462 A | 12/1999 | Birrell et al. | 709/206 |
| 6,012,068 A | 1/2000 | Boezeman et al. | 707/104 |
| 6,014,429 A | 1/2000 | LaPorta et al. | |
| 6,018,665 A | 1/2000 | Chavez, Jr. et al. | |
| 6,021,433 A | 2/2000 | Payne et al. | |
| 6,038,595 A | 3/2000 | Ortony | |
| 6,073,034 A | 6/2000 | Jacobsen et al. | |
| 6,073,148 A | 6/2000 | Rowe et al. | 707/542 |
| 6,076,109 A | 6/2000 | Kikinis | 709/228 |
| 6,081,706 A | 6/2000 | Muths et al. | |
| 6,085,098 A | 7/2000 | Moon et al. | |
| 6,088,340 A | 7/2000 | Buchholz et al. | 370/310 |
| 6,088,457 A | 7/2000 | Parkinson et al. | |
| 6,088,730 A | 7/2000 | Kato et al. | |
| 6,091,956 A | 7/2000 | Hollenberg | |
| 6,104,334 A | 8/2000 | Allport | |
| 6,108,727 A | 8/2000 | Boals et al. | |
| 6,112,099 A | 8/2000 | Ketola | |
| 6,118,856 A | 9/2000 | Paarsmarkt et al. | |
| 6,119,155 A | 9/2000 | Rossmann et al. | |
| 6,122,263 A | 9/2000 | Dahlin et al. | |
| 6,128,509 A | 10/2000 | Veijola et al. | |
| 6,131,040 A | 10/2000 | Knuutila et al. | |
| 6,134,432 A | 10/2000 | Holmes et al. | |
| 6,137,473 A | 10/2000 | Cortopassi et al. | |
| 6,138,004 A | 10/2000 | McGregor et al. | |
| 6,138,009 A | 10/2000 | Birgerson | |
| 6,138,036 A | 10/2000 | O'Cinneide | |
| 6,144,942 A | 11/2000 | Ruckdashel | 705/9 |
| 6,151,491 A | 11/2000 | Farris et al. | |
| 6,152,369 A | 11/2000 | Wilz, Sr. et al. | |
| 6,157,935 A | 12/2000 | Tran et al. | 707/503 |
| 6,161,134 A | 12/2000 | Wang et al. | 709/220 |
| 6,169,911 B1 | 1/2001 | Wagner et al. | 455/566 |
| 6,199,099 B1 | 3/2001 | Gershman et al. | 709/203 |
| 6,292,473 B1 | 9/2001 | Duske, Jr. et al. | 370/316 |
| 6,313,852 B1 | 11/2001 | Ishizaki et al. | 345/751 |
| 6,356,543 B1 | 3/2002 | Hall et al. | 370/352 |
| 6,356,905 B1 | 3/2002 | Gershman et al. | 707/10 |
| 6,400,958 B1 | 6/2002 | Isomursu et al. | 455/466 |
| 6,401,085 B1 | 6/2002 | Gershman et al. | 707/4 |
| 6,438,575 B1 | 8/2002 | Khan et al. | 709/200 |
| 6,480,853 B1 * | 11/2002 | Jain | 707/10 |
| 6,509,913 B1 | 1/2003 | Martin, Jr. et al. | 345/762 |
| 6,526,274 B1 | 2/2003 | Fickes et al. | 455/414 |
| 6,529,903 B1 | 3/2003 | Smith et al. | 707/7 |
| 6,556,997 B1 | 4/2003 | Levy | 707/10 |
| 6,560,604 B1 | 5/2003 | Fascenda | 707/10 |
| 6,601,061 B1 * | 7/2003 | Holt et al. | 707/3 |
| 6,633,759 B1 | 10/2003 | Kobayashi | 455/419 |
| 6,636,854 B1 * | 10/2003 | Dutta et al. | 707/10 |
| 6,671,715 B1 | 12/2003 | Langseth et al. | 709/203 |
| 6,678,361 B1 | 1/2004 | Rooke et al. | 379/93.24 |
| 6,684,088 B1 | 1/2004 | Halahmi | 455/566 |
| 6,701,378 B1 | 3/2004 | Gilhuly et al. | 709/249 |
| 6,725,275 B1 * | 4/2004 | Eyal | 709/231 |
| 6,741,853 B1 | 5/2004 | Jiang et al. | 455/418 |
| 6,826,554 B1 | 11/2004 | Sone | 707/2 |
| 2001/0006889 A1 | 7/2001 | Kraft | 455/412 |
| 2001/0054020 A1 * | 12/2001 | Barth et al. | 705/37 |
| 2002/0024536 A1 | 2/2002 | Kahan et al. | 345/745 |
| 2002/0049858 A1 | 4/2002 | Frietas et al. | 709/246 |
| 2002/0054090 A1 | 5/2002 | Silva et al. | 345/747 |
| 2002/0065110 A1 | 5/2002 | Enns et al. | 455/566 |
| 2002/0103935 A1 | 8/2002 | Fishman et al. | 709/246 |
| 2002/0107904 A1 | 8/2002 | Talluri et al. | 709/202 |
| 2004/0205106 A1 | 10/2004 | Adler et al. | 709/200 |

FOREIGN PATENT DOCUMENTS

WO      WO 98/00787      1/1998

OTHER PUBLICATIONS

U.S. Appl. No. 09/750,320, filed Dec. 29, 2000, Rouse et al.

* cited by examiner

E-mail Module
410

| Mail Menu 510 | Trash Lists 516 |
| Action Menu 512 | New Memo 518 |
| Draft Lists 514 | Search 520 |

FIG. 5

New Memo

To: ▭ 810 cc: ▭ 812 bcc: ▭ 814

Subject: ▭ 816

Body: ▭ 818

FIG. 8

Calendar Module

| View 910 | | Modify Appointment 916 |

| Add Appointment 912 | | Schedule Meeting 918 |

| Delete Appointment 914 | | Send 920 |

FIG. 9

SYSTEM AND METHOD FOR PROVIDING SEARCH CAPABILITIES AND STORING FUNCTIONS ON A WIRELESS ACCESS DEVICE

CROSS REFERENCE TO RELATED APPLICATIONS

This application is a Continuation-in-Part of prior application Ser. No. 09/750,301, filed Dec. 29, 2000. This application is also a Continuation-in-Part of prior application Ser. No. 09/750,320, filed Dec. 29, 2000. The entire disclosure of the prior application is considered as being part of the disclosure of the accompanying applications and are hereby incorporated by reference therein.

FIELD OF INVENTION

The present invention relates generally to the field of wireless device access and, in particular, to a system and method for enabling users to search messages and other information received and displayed on mobile devices, storing search data and other user input and preferences in a file, and enabling users to access server-based information using mobile devices over wireless data networks.

BACKGROUND OF THE INVENTION

Generally, mobile devices provide various communication capabilities to users. Currently, users may access the Internet through personal mobile devices. For example, users may read local and world news headlines and/or short summaries on a mobile device, such as a Personal Digital Assistant (PDA), mobile phone, pager, etc. Users may also receive alerts and predetermined triggers, such as stock movement and other events. However, the amount and type of information received may be limited due to hardware and physical limitations of a mobile device. For example, information received on a mobile device may not be easily viewable due to the limited screen space of a mobile device.

While mobile devices may access information through the Internet, access to a corporate or other network may be limited. Also, information transferred from a server on a network to a mobile device may require conversion to a form viewable on a mobile device. This process may require restructuring and re-writing applications and other modifications. Oftentimes, users may need to access critical data and other information stored on the user's personal computer located on a corporate (or other) network. However, such information may not be easily accessed through a mobile device due to conversion and display limitations. Thus, information retrieval may be limited to mobile users.

Mobile devices and wireless networks rely on a broad spectrum of technology. In comparison to personal or desktop computers, each class of mobile device may currently represent a unique hardware and software platform. For example, mobile phones and PDAs may have varying capabilities and limitations as computing devices and client devices accessing corporate and other networks. The wireless networks that support mobile devices may be similarly diverse.

In addition, users may find viewing, storing, sending, and maneuvering through information displayed on a mobile device to be difficult and limiting. This may be due to the lack of customization available on mobile devices.

These and other drawbacks exist with current systems.

SUMMARY OF THE INVENTION

Additional advantages of the invention will be set forth in part in the description which follows, and in part will be obvious from the description, or may be learned by practice of the invention. The advantages of the invention may be realized and attained by means of the instrumentalities and combinations particularly pointed out in the appended claims.

The present invention provides interactive access to various databases and directories from web-enabled mobile devices, such as mobile phones, pagers, and PDAs. The present invention enables users (e.g., users of Lotus Notes™) to remotely interact with messaging infrastructure using a variety of mobile devices over wireless data networks. The present invention offers broad sets of features that extend the reach of services to small, wireless devices, such as mobile phones, pagers, PDAs with wireless modems. Users may send and receive messages, alerts, pages, notifications and other forms of information to mobile devices from the user's desktop. Wireless access features of the present invention enable users to remotely access servers over wireless data networks and interact with databases and public directories using mobile devices equipped with micro-browsers.

The present invention may further provide search capabilities on a wireless device. Search criteria may include searching messages (e.g., electronic mail, memoranda, and/or other correspondences and documents) based on various fields, such as sender, date, subject and other parts of a message. Other search criteria may also be used.

The present invention may further provide storing capabilities wherein search data and other user input and preferences may be stored in a file associated with the wireless client device. The file may be stored on a wireless client device. The storing capabilities of the present invention may facilitate searching techniques. In addition, the storing capabilities may retain user selected preferences, views and other information for future wireless access.

The present invention may also provide an application search form to perform various search functions. A search form may contain a formula field where the field may contain a select formula that may be evaluated on the server for the search operation. This formula typically may reference other fields on the search form. For example, a designer may add a From field on an e-mail application search form so that the user may search for electronic mail (e-mail) (or other correspondences and documents) from a particular person or group. Also, a search form may optionally contain a field that may contain a view or folder name which may be used to further constrain the search to documents in a specified view or folder. Other specifications may be defined and other criteria may be applied.

The accompanying drawings, which are incorporated in and constitute a part of this specification, illustrate various embodiments of the invention and, together with the description, serve to explain the principles of the invention.

BRIEF DESCRIPTION OF THE DRAWINGS

FIG. 5 is a diagram of functions available on an electronic mail module, according to an embodiment of the present invention.

FIG. 8 is an example of a screen shot for a new memo for a mobile device, according to an embodiment of the present invention.

FIG. 9 is a diagram of functions available on a calendar module, according to an embodiment of the present invention.

DETAILED DESCRIPTION OF THE PREFERRED EMBODIMENTS

Figure 1:
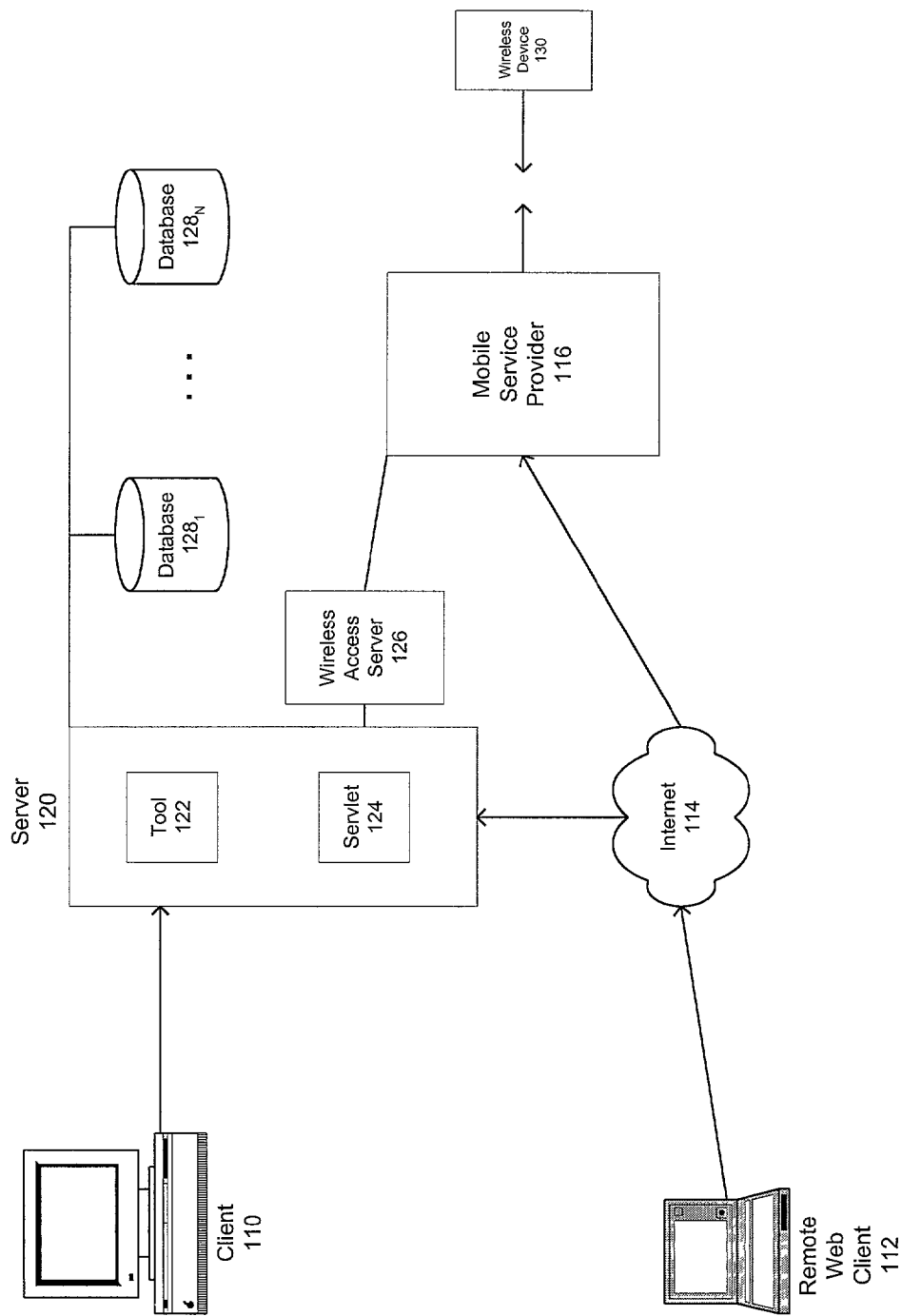
FIG. 1 is a diagram of a functional overview of an overall system, according to an embodiment of the present invention.

Mobile services of the present invention enable desktop and web browsers (e.g., users of Lotus Notes™) to communicate directly with one- and two-way wireless devices worldwide. The present invention allows for easy administration for multiple wireless services, while giving each user the ability to control when and what may be received on the user's mobile devices. Users may get direct access to e-mail, calendar, public directories and other information from their data-capable mobile phone, interactive pager or other wireless device, via a wireless service provider. Wireless device access enables users to have instant access to critical information wherever the user may happen to be, via a wide range of communication devices and wireless networks.

Users may also customize the information that is received and sent from mobile devices. For example, the user may select to receive e-mail (or other correspondences) from a particular individual or group of individuals. The user may also select to receive a particular type of types of e-mails (or other correspondences), such as the ones marked as high priority or otherwise designated as being important. Other variations may also be implemented. In addition, the user may customize responses, replies and other outgoing information from the user's mobile device. For example, a user may select from a list of possible customized replies, which may include "will discuss later", "will call later" and other replies. Customized replies may be predetermined for varying types of actions. For example, for a stock broker, possible replies may include "buy", "sell", "hold", etc.

Various messaging services may be available through the present invention. For example, mobile services may convert e-mail messages in order to transmit the email messages to mobile devices over a variety of data messaging networks including paging services, mobile phone networks, wireless data networks, and other networks. Users may compose e-mail messages using an e-mail template (or form) and address them to mobile device recipients using an e-mail alias (e.g., "John Smith Mobile"). Users may compose messages with standard e-mail memo and address messages to email and mobile device recipients. E-mail messages may be routed normally and messages intended for pagers or other wireless devices may be routed through a foreign domain.

The outbound message may be converted into an appropriate format for the device and data network and may be forwarded via modem or Internet Protocol (IP) connection to the service provider. The wireless service may then transmit the message to the appropriate mobile device. According to an embodiment of the present invention, a sender of the message may add acceptable replies at the end of an outgoing message to receive an immediate answer from the mobile device user. These replies may be sent to the mobile device along with the message. Mobile services may then poll the wireless service provider periodically looking for the response from the message recipient. Once received, the response may be deposited in the originator's e-mail inbox.

A wireless access server of the present invention allows mobile users to use a variety of devices to access information in servers via wireless IP service providers. A wireless access server may act as a proxy for handling communications between the server and mobile devices, such as mobile phones, PDAs, two-way pagers equipped with text-based micro-browsers and other devices. Text-based browsers may use wireless markup language ("WML"), handheld device markup language ("HDML") or other language to send requests and receive data via wireless IP data network to HDML servers which reside at the wireless service provider's operations center. The HDML server may forward the requests to a server (e.g., a Mobile Services for Domino ("MSD") server offered by Lotus Development Corporation) via frame relay or server sockets layer ("SSL") Internet connection. A wireless access server may interpret the request, act as a proxy between the mobile device and the server, and pull the requested information from one or more databases. The information may be formatted by the wireless access server and sent back to the mobile device.

An end user may use a wireless device to navigate a series of menus to request information from the server. The wireless access server may allow access to an end user's e-mail account, calendar, public directory and other information.

For example, an end user may view a personal e-mail inbox or search for messages by date, sender, subject or other criteria. The user may read e-mail messages, forward messages to other recipients or fax hard copies of the messages to one or more fax machines. Other operations may also be performed. The user may also compose a new e-mail memo, delete unwanted messages from the e-mail database and save drafts of memos and other information.

An end user may also perform various scheduling operations. For example, the user may view daily schedules and send selected one or more schedules to one or more fax machines or other recipients. Thus, if a mobile user's administrative assistant or colleague creates a new appointment or edits an existing appointment, the user may be notified of the changes immediately. Users may also create new calendar entries, including appointments, events, reminders and other entries.

A public directory may also be accessible to a user through a wireless device, such as a mobile phone, PDA, pager or other device. Other directories maintained through the server may also be accessed. For example, a personal or private directory created by the user and maintained on the server may be accessed. A user may search the public (or other) directory by last or first name (or other criteria) and view the individual person records on the mobile device.

Once the appropriate person is located and displayed, the user may automatically create an e-mail message or initiate an outgoing call.

According to another embodiment of the present invention, users who are external to an entity's messaging infrastructure may access the mobile services of the present invention. An entity may include a business, corporation or other group of individuals. A web site may be created which enables users from outside the entity to compose messages and receive responses from mobile device users. A customer or business partner may point their browser to the web site, compose a message, and select one or more recipients from a list of mobile device users in the entity, e.g., corporation. The list of registered device users may be controlled (or maintained) by a system administrator or other authorized entity. For example, individuals that may be accessible by customers, prospects and partners may be listed on the web site.

Mobile services may provide a set of enhanced application interface extensions, enabling developers (or other authorized entities) to configure custom mobile applications for use on handheld, wireless and mobile devices. For example, to enhance an organization's responsiveness to customers, users may enable an existing customer care solution to distribute messages (or other information) to a remote customer service representative via pager, mobile phone or other mobile device, upon receipt of a predetermined trigger, such as a trouble ticket or other alert. The representative may then send a reply to the customer's e-mail address instantly from the mobile device.

The present invention further enables IT managers, systems administrators and other authorized entities with enhanced security features that may include the ability to restrict the devices and wireless services that are allowed to access information and/or data.

Incompatibility issues may exist when enabling e-mail functions and access to information from various databases on a server via a mobile device. For example, mobile devices may not have certain capabilities and viewing options available on a desktop computer connected to a network. Physical and technological impediments may exist. For example, the screen of a mobile device, such as mobile phone, may not be able to support a large amount of text due to the mobile phone's compact size thereby limiting the amount of information viewable at once. Also, certain texts, images and other attachments may not be easily viewable or accessed by a mobile device, due to limiting screen size and other capabilities. Also, as mobile devices may be used to access information from anywhere in the world, various time/date incompatibilities may exist as well.

The present invention may create and customize style sheets that may be applied to data sent to and from a mobile device. The present invention provides a method and system for converting data sent to and from a mobile device in a format that may be understandable to a mobile device and viewable on a mobile device.

FIG. 1 illustrates a diagram of a functional overview of an overall system for providing wireless device access, according to an embodiment of the present invention. One or more clients 110 may access a server 120 through a desktop terminal. In addition, one or more remote web clients 112 may access server 120 through Internet 114 or other communication means. Server 120 may comprise various modules, databases and other functions, such as tool 122 and servlet 124. In addition, one or more databases $128_1$–$128_N$ may store information related to electronic e-mail, directories, calendar, scheduling applications, and/or other applications. Other components, functions and databases may also be provided. A wireless access server 126 may be connected to a Mobile Server Provider 116, which may also communicate through Internet 114. Mobile Server Provider 116 provides communication with one or more mobile devices 130, such as a pager, a mobile phone, a PDA and other wireless devices. This system enables a wireless device to access and interact with information stored and maintained on Server 120. The present invention further provides that the information transmitted to and from mobile device 130 will be in a format acceptable for display and access on a mobile device.

The wireless implementation of the present invention may include a mobile application development tool 122 and a wireless servlet 124 which runs on Server 120. Other components, tools and applications may also run on Server 120. Tool 122 may serve to allow the design of a mobile version of applications to run (or execute) successfully on various wireless devices. Servlet 124 may provide wireless device users real-time access to various databases and other information maintained on Server 120. Thus, the present invention provides an infrastructure that allows devices using other markup languages to be supported using the same or similar architecture.

Figure 2:
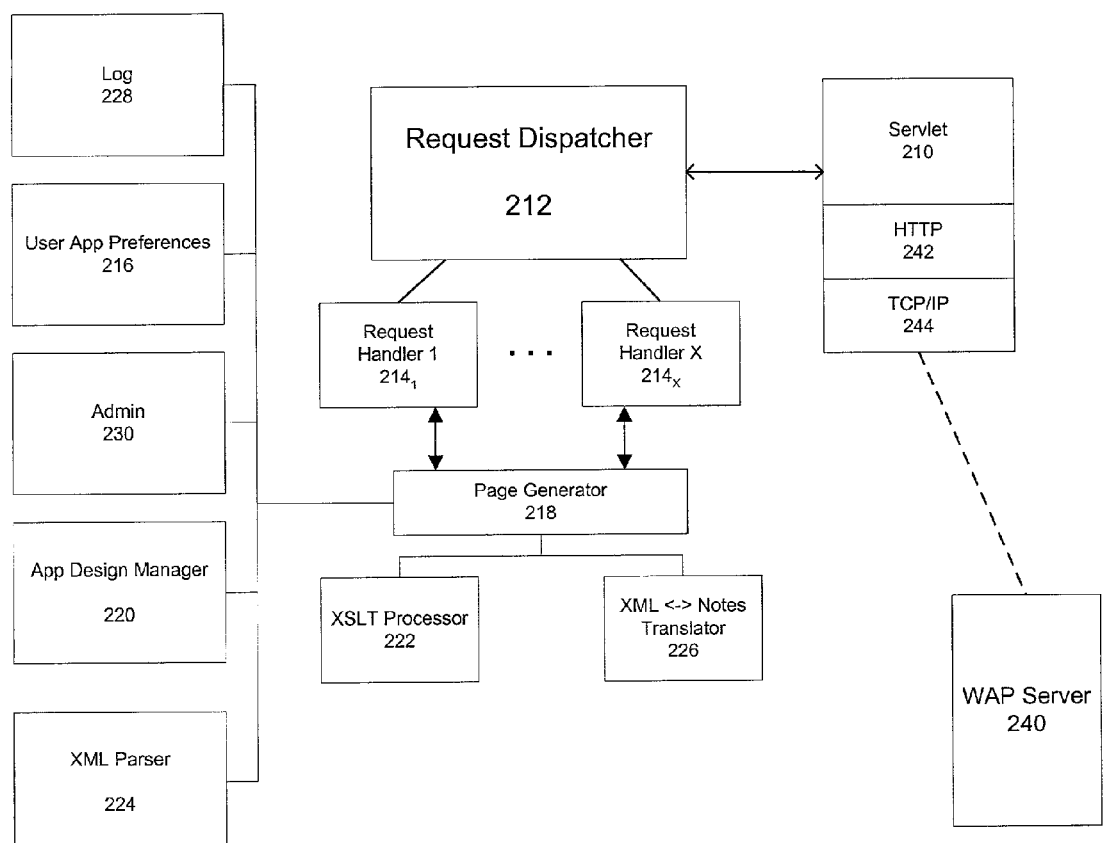
FIG. 2 is a diagram of a wireless servlet, according to an embodiment of the present invention.

FIG. 2 illustrates a diagram of various subsystems of a wireless servlet, according to an embodiment of the present invention. Wireless Servlet 124 may include various subsystems, such as servlet subsystem 210, request dispatcher 212, request handlers $214_1$–$214_X$, user application preferences 216, page generator 218, application design manager 220, XSLT processor 222, XML parser 224, XML-notes translator 226, log 228, and administrator 230. Other subsystems, modules, functions and components may also be implemented.

Servlet subsystem 210 may be a class derived from a Hypertext Transport Protocol ("HTTP") servlet base class that receives Get, Post and other requests from a device, such as a mobile device via a Wireless Application Protocol ("WAP") server 240, for example, for providing applications over wireless communication networks, through HTTP 242, TCP/IP 244 or other connection. It may be written in Java or other programming language. Servlet subsystem 210 may interface with request dispatcher 212. Server subsystem 210 may use Java Native Interface ("JNI") (or other mechanism) to pass request dispatcher 212 each request with user data, HTTP header information, session identifier and other information. In return, request dispatcher 212 may return a response along with session information and other information. Request dispatcher 212 may be responsible for retrieving the correct session context, invoking the correct request handler $214_1$–$214_X$ for each request, and returning one or more responses to servlet subsystem 210. Request handlers 214 may process one or more requests from the device and send response pages back to the device, such as WML decks or WML script bytecodes. For example, request handlers 214 may exist for requests, such as login, open application, and send e-mail. Request handlers 214 may also update the session state and other information. Request handlers 214 may include requests related to basic operations (e.g., open application, read, view, open document, read item, edit document, save document, delete document, create document, etc.), electronic mail (e.g., compose, send, save, etc.), calendar (e.g., invite, read, add, schedule meeting, fax, etc.), search functions (e.g., address search, find address, application search, etc.), and miscellaneous (e.g., edit user profile, save user profile, login, go to home deck, load script, move to folder, session term, etc.).

User application preferences 216 may manage user-specific settings for a particular application. The designer of a mobile application may include application specific mobile settings, such as user preferences, as part of the application design. Application specific settings may also include settings such as the default form or view to use. Page generator 218 may be responsible for creating content pages, such as WML decks, which may be sent to a wireless device. It may use Extensible Markup Language ("XML")—Notes translator 226 to convert data to XML, the application design manager 220 to retrieve Extensible Stylesheet Language ("XSL") style sheets and XML Stylesheet Language Transformations "(XSLT") processor 222 to produce the output page.

Application design manager 220 may be responsible for retrieving mobile application design information, such as XSL style sheets used for combining document data with forms. Application design manager 220 may also retrieve design elements from an application (or other) database. XSLT processor 222 may transform an XML document to a different XML document based on an XSL style sheet. For example, a document represented in a markup language may be transformed to a representation in WML using XSLT processor 222. XML Parser 224 may provide the capability to parse XML documents using Document Object Module ("DOM"), Simple Application Program Interface for XML ("SAX") or other objects. XML—Notes translator 226 may be used to transform documents and view data from an internal format to XML documents. Log 228 may track and maintain errors and other events. Administrator 230 may provide administration and configuration information, which may be stored in one or more databases, to other subsystems. Wireless-specific user settings may include the user's wireless homepage and locale settings, such as the language used by the user.

Figure 3:
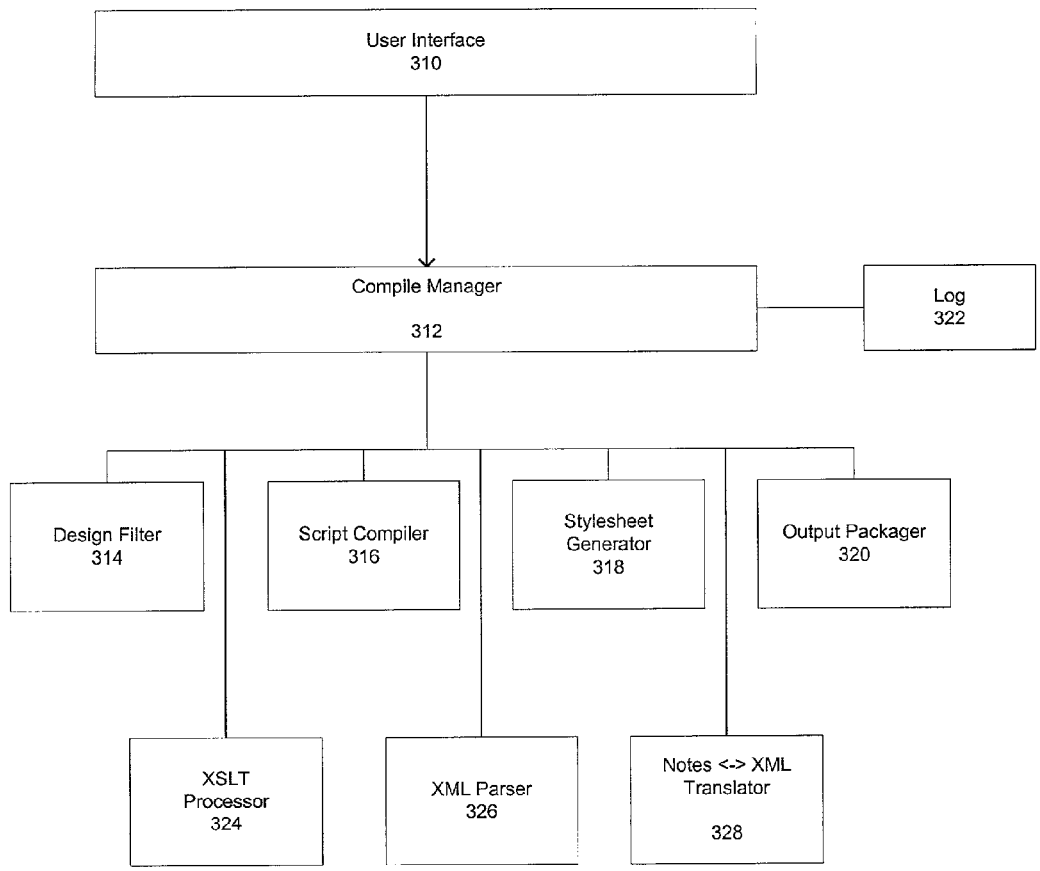
FIG. 3 is a diagram of a mobile application development tool, according to an embodiment of the present invention.

FIG. 3 illustrates a diagram of various subsystems of a mobile application development tool, according to an embodiment of the present invention. A mobile application development tool may include various subsystems, such as user interface 310, compile manager 312, design filter 314, script compiler 316, style sheet generator 318, output packager 320, log 322, XSLT processor 324, XML parser 326, and Notes—XML translator 328. Other subsystems, modules, functions and components may also be implemented. The mobile application development tool may be used by a designer to make views/folders available to a user using a wireless device.

User interface 310 may include a form which may be completed by an application designer (or other authorized entity) in order to identify the design elements that may be used in a mobile application. User interface 310 may pass a compile document to compile manager 312 in order to produce a compiled mobile application. Compile manager 312 may receive one or more compile requests from user interface 310 where one or more other subsystems may complete the compilation process.

Design filter 314 may validate that the design elements do not contain elements that are not needed or are not supported by the destination device (e.g., mobile device). Elements not needed may be removed and elements that are not supported may result in compile and/or other errors. Script compiler 316 may convert a subset of @functions and JavaScript (or other script) to WML script (or other wireless script). Other scripts such as LotusScript may also be converted to WML script. Style sheet generator 318 may use XSL style sheets to generate application specific XSL style sheets that may become part of a compiled mobile application and may be used by a wireless servlet at run-time. Other types of style sheets may also be generated. Output packager 320 may store a compile output in a special mobile class. Compile output may include an application digest, style sheets and script compilation units. Other information may also be included in a compile output. Log 322 may track and/or record errors and other events.

XSLT processor 324 may transform an XML document representing a design element, such as a form, to an XSL style sheet based on another XSL style sheet. XML parser 326 may provide the capability to parse XML (or other) documents using DOM, SAX or other objects. Notes—XML Translator 328 may transform design elements from an internal format to XML documents or other form of documents.

Style sheets may be both input and output of a mobile application compilation process. Style sheets may include view, read document, edit document, create document, forward document, read item, read e-mail, edit e-mail, create e-mail, read invitation, read calendar, edit calendar, create calendar, search address, search application, user profile and others.

Figure 4:
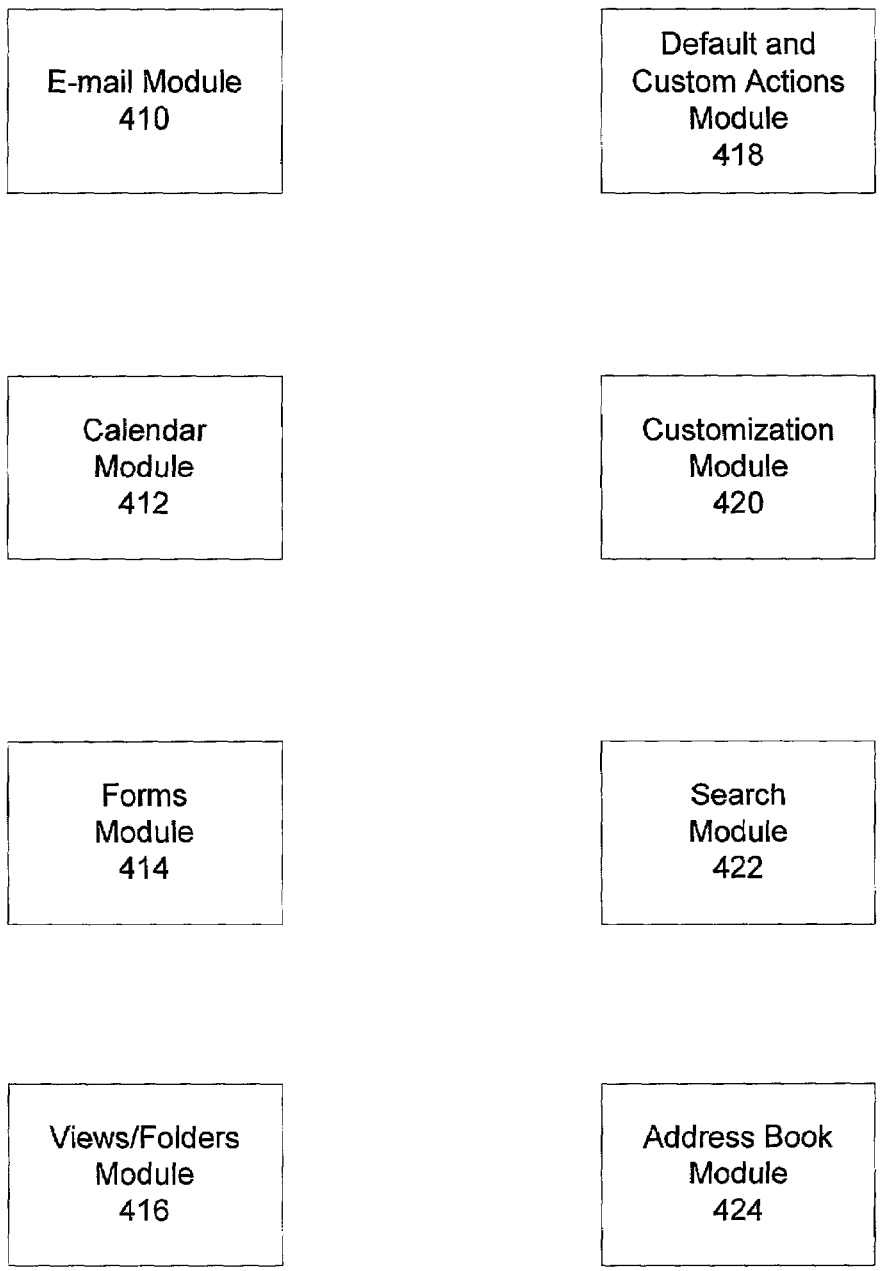
FIG. 4 is a diagram of modules for a mobile device access system, according to an embodiment of the present invention.

FIG. 4 is a diagram 400 of modules available on a mobile device access system, according to an embodiment of the present invention. A module may be a processor of related task requests from users of mobile devices. Various modules and functions may be available through the system of the present invention. Modules may include e-mail module 410, calendar module 412, forms module 414, view/folders module 416, default and custom actions module 418, customization module 420, search module 422 and address book module 424. Other modules may also be implemented.

E-mail module 410 may access the functionality of address book module 424. This may be achieved using application calling developed by the Lotus Development Corporation. Application calling enables a user using a first application accessible from a wireless device to access a service of a second application. The user may then return to the first application without losing the context of the first application. For example, e-mail and calendar applications may use applications calling for name and telephone number searches via address book module 424. Thus, applications calling may simulate process forking on a wireless device.

Address book module, as shown in FIG. 4, may provide the user with a list of recipients for an e-mail or other correspondence, according to an embodiment of the present invention. The address book may display information of individuals stored in public, private, personal and other directories. Information may include a list of individuals, including full name, e-mail address, various phone numbers, address information, aliases and other personal and contact information.

The present invention allows WAP browser enabled wireless devices access to various applications. Users may access e-mail, calendar, personal, public and other directories from mobile devices, such as mobile phone, interactive pager, PDA, via a wireless service provider.

As various applications may be supported, a user may customize the type of information, the format of the information and other characteristics related to information received on a mobile device. For example, a user may customize various rules or priority instructions for viewing received information on a mobile device. A user may request a rule where e-mail (or other information and correspondences) received from a particular person or group of persons may be sent to an identified mobile device. Alerts may also be programmed for a particular person or group of persons or other predetermined triggering events (e.g., stock activity). The user may also limit messages (or other correspondences) sent to an identified mobile device to messages marked with high (or other level of) priority or otherwise identified as being important. Viewing options may include enabling the user to choose which features (or lines) of a message that the user would like to make viewable. For example, the user may want to limit incoming message views to select fields, such as From field and subject line field, which may include up to a predetermined number of characters. Other customized rules and viewing options may be defined by the user and applied by the system of the present invention. Other customizations and options may be available.

FIG. 5 illustrates various functions and operations may be available through an e-mail module, according to an embodiment of the present invention. E-mail module 410 may include e-mail menu 510, action menu 512, draft lists 514, trash lists 516, new memo 518 and search 520. Other functions and operations may also be available.

Draft lists may be displayed, as shown by 516 in FIG. 5, to the user, according to an embodiment of the present invention. Draft lists may be displayed as a list of draft view messages where messages may be displayed in descending date order. Other viewing orders may also be implemented. Drafts may include messages or other memos that have not been completed or sent yet.

Trash lists may be displayed, as shown by 518 in FIG. 5, to the user, according to an embodiment of the present invention. Trash list may display a list of messages in a trash folder, according to a particular order, which may include descending order by date, ascending order by date, or other specified order. E-mails or other messages that have been deleted may be stored in a trash folder.

New memo functionality, as shown by 520 in FIG. 5, may be available, according to an embodiment of the present invention. FIG. 8 illustrates an example of a screen for composing a new memo, as displayed on a mobile device, according to an embodiment of the present invention. A new memo may include various fields. For example, a recipient field may be identified in line 810. One or more recipients may be identified as well as groups of recipients. An information copy of the memo may be sent to an identified recipient in line 812. Line 814 may enable the user to send one or more recipients a blind information copy of the memo where other recipients may not see the one or more names (or other identifier) specified in line 814. Subject field 816 enables the user to enter text for the subject of the outgoing e-mail message. Body field 818 may contain the text for the body of the outgoing e-mail message. Memo options may include sending the message, canceling the message, saving the message as a draft and other options. Other fields and operations may be implemented. According to an embodiment of the present invention, each field (e.g., 810, 812, 814, 816 and/or 818) may be a separate screen on a mobile device.

Search functions, as shown by 522 in FIG. 5, may also be available to the user, according to an embodiment of the present invention. Search criteria may include searching messages (e.g., e-mails, memos, and/or other correspondences and documents) based on various fields, such as sender, date, subject and other parts of a message. Other search criteria may also be used. For example, a user may select the sender (or from) field to enter text (e.g., a character, string of characters, etc.) which may be used to match the sender (or from) field in documents in an e-mail or other database. The search may use a "contains" mechanism which may give a positive match on any document which has a sender (or from) field containing the text string provided. A user may also select a subject field to enter text which may be used to match the subject field in documents in an e-mail or other database. The search may use a "contains" mechanism which may give a positive match on any document which has a subject field containing the text string provided. In addition, the user may select a date field to enter a date which may be used to match the delivered (or sent) date in documents in an e-mail or other database. The search may use a "since" mechanism which may give a positive match on any document which has a delivered (or sent) date greater than or equal to the data provided. Other search mechanisms may also be implemented. Other fields may also be used to search from. Numeric strings and/or text and number combination strings may also be used as search criteria.

Figure 6:
FIG. 6 is an example of a screen shot of an e-mail menu for a mobile device, according to an embodiment of the present invention.

FIG. 6 illustrates an example of an e-mail menu as displayed on a mobile device, according to an embodiment of the present invention. The e-mail menu screen 600 may include various viewing options which the user may select. Viewing options may include viewing new e-mail by date 610, new e-mail by author 612, inbox by date 614, inbox by author 616, drafts 618, trash 620, and all documents 622. Other viewing options may also include new memo 624, search all 626 and other views.

Unread e-mail may be displayed to the user where the user may specify a criteria for a display list, such as new e-mail by date, by author, by subject and other criteria. For example, new e-mail by date 610 may display a list of unread messages from an inbox folder to the user, received on a particular date or range of dates. Information associated with each message may be displayed to the user, such as the subject of each message. A user may also select to view the first predetermined number of words or letters of the message and/or subject for a quick view. A viewing order may be implemented to display the messages, such as chronological, reverse chronological, alphabetical and other viewing orders. New e-mail by author 612 may display a list of messages according to a specified sender (or originator). New e-mail by author 612 may also display messages according to a string entered, such as part of an identifier (e.g., name) associated with one or more senders. The string may include characters of the last name, first name, or other identifier of one or more senders.

Inbox by date 614 may display a list of messages to the user where all messages from an inbox folder may be included. Information associated with each message may be displayed, such as subject, author, etc. Reverse chronological or other identified order may be used to display the messages. Inbox by author 616 may display messages by an identified author or authors with a common string of characters or other criteria.

Drafts view 618 may display a list of messages to the user where some or all messages from a drafts folder may be included. Information associated with each message may be displayed, such as subject, author, etc. Trash view 620 may display a list of messages from a trash folder. Information associated with each message may be displayed, such as subject, author, etc. All documents view 622 may display all current documents available to the user. Various display orders may be used, such as chronological, reverse chronological, alphabetical, etc.

New memo view 624 may allow the user to create and send a new outgoing email message. Search all view 626 allows the user to search the e-mail database for all messages which match a criteria.

Phone keys 640 may serve as short cut keys for moving to the option with the corresponding number, thus selecting the option and invoking it. Arrow 630 indicates to the user which option may be currently invoked. The invention may determine whether, for example, a micro-browser enables phone keys 640 to serve as short cut keys. If this feature is enabled, the invention may generate markup language deck based on this determination.

Figure 7:
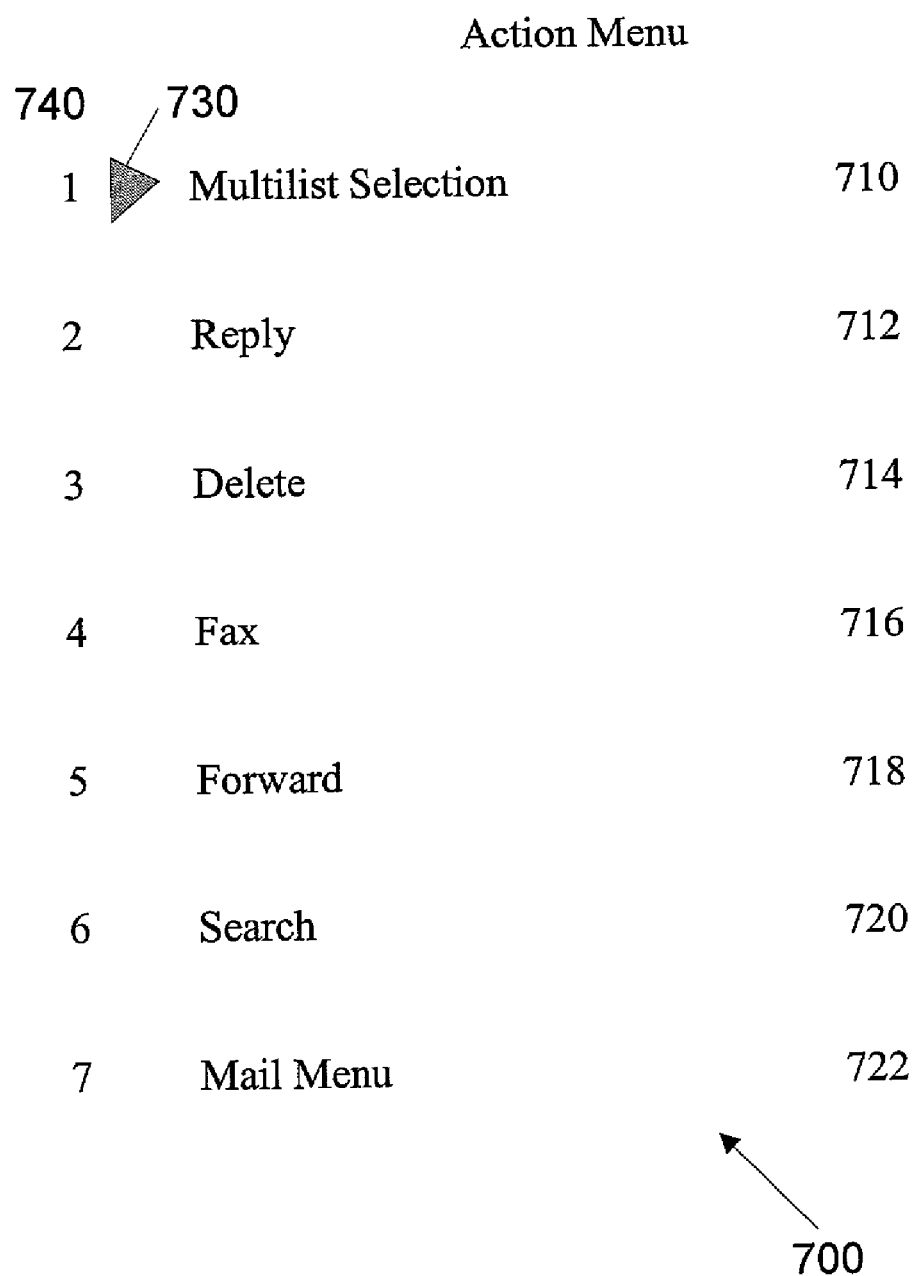
FIG. 7 is an example of a screen shot of an action menu for a mobile device, according to an embodiment of the present invention.

FIG. 7 illustrates an example of an action menu for an e-mail application as displayed on a mobile device, according to an embodiment of the present invention. The action menu screen 700 may include various action options which the user may select. Action options may include multiple selection 710, reply 712, delete 714, fax 716, forward 718, search 720, e-mail menu 722. Other action options may also be implemented.

Multi selection 710 enables the user to act on multiple selected messages at once. For example, the user may request that two or more messages be deleted, moved, or otherwise acted on with a single request. Reply 712 enables the user to reply to a selected message. Various reply options may also be available. For example, a user may select to reply, reply with history, reply to all, and reply to all with history. User defined customized replies may also be available. Other reply options may be available. Delete 714 enables the user to delete a selected message where the deleted message may be moved to a trash folder. In addition, a delete message may be displayed to the user to confirm this action. Fax 716 may send the selected message to one or more fax machines specified by the user. Forward 718 enables the user to forward a selected message in a new memo. Search 720 enables the user to search the current view for messages which match the supplied criteria. A search string entered by the user is matched if the field contents contain the entered search string. E-mail menu 722 navigates the user back to the e-mail application menu. Other options may be available to the user, such as access to a calendar application, address book application and other applications.

Phone keys 740 may serve as short cut keys for moving to the option with the corresponding number, thus selecting the option and invoking it. Arrow 730 indicates to the user which option may be currently invoked. The invention may determine whether, for example, a micro-browser enables phone keys 740 to serve as short cut keys. If this feature is enabled, the invention may generate markup language deck based on this determination.

FIG. 9 illustrates various functions and operations that may be available through a calendar module, according to an embodiment of the present invention. A calendar module 412 may provide a menu of options. For example, view 910 may provide viewing options, such as daily view, weekly view, monthly view and other selected time frames. Also, add appointment 912 may enable a user to add one or more appointments, delete appointment 914 may enable a user to delete one or more appointments and modify appointment 916 may enable a user to modify one or more existing appointments. Other operations are also available. A user may schedule one or more meetings with various participants through schedule meeting 918. Intended participants may include individuals stored in databases, directories and/or address books. One or more calendar entries and other various information may be forwarded/sent to one or more recipients through send 920. For example, selected calendar entries may be faxed or e-mailed to recipients. Other operations may also be available.

Various functions and operations may be available through a Forms module 414, according to an embodiment of the present invention. The present invention may create forms that the end user may use to display, edit or create new documents on a wireless device. Also, these forms may include subforms. When an application designer creates mobile versions of existing forms in a wireless access application, the alias for the mobile forms may be the existing form name or the existing form alias name. For example, an e-mail application may have a mobile form named MobileMemo, which may be a modified version of the Memo form. The alias for the MobileMemo form may be "Memo." This allows documents created on a mobile device and saved on the server to be viewed properly from the client or a web browser. It also allows form names saved in documents to be matched with the names of mobile forms.

An application designer may also create multiple forms with the same alias. This may be useful for allowing the end user to choose the form to use to display or edit documents. The application designer may also designate that a form be used only for reading or only for editing documents. Other restrictions may also be applied. Default forms may be specified as well.

Form may support varying components, such as text, field, subform, default actions (e.g., categorize, send document, forward, move to folder, remove from folder), custom actions, images, and other actions.

Form properties used in a wireless access application form may include name, which may be used as a form name when selecting a form to display a document on a mobile device; alias, which may be used as a form name in a document when creating a new document on a mobile device; type, which may be used when creating a response document on a mobile device; automatically enable edit mode; and default read access for documents created with the form, which may be used to determine whether the user is allowed to use the form on the mobile device. Other form properties may also be available.

Varying fields may be supported in a form or subform, such as rich text, text, date/time, number, checkbox, radio button, listbox, authors, names, readers and other fields. Rich text fields may be treated as simple text fields when sent to a mobile device where the text may be used and any embedded objects may be ignored or otherwise suppressed. However, attachments and other objects may be addressed. For example, when an attachment appears in a rich text field, a text replacement string may be substituted for the attachment in the text stream sent to the mobile device. Rich text fields in a wireless access application may also be assigned a truncation property, where a predetermined number of bytes of field (or number of characters) contents may be sent to the mobile device.

Text fields may allow for multiple values, for example. Text fields in a wireless access application may also be assigned a truncation property in a similar manner as Rich text fields. Text fields may also be assigned a "Mail To" property. If a form has a text field with a "Mail To" property, then whenever a document is displayed with this form a "Mail" action may be available on the mobile device. The e-mail action may allow the user to create an e-mail (or other message) with the "To" field pre-filled with the value of this field. If more than one field in a form has the "Mail To" property, then the user may be presented with the available e-mail address choices.

Text fields in a wireless access application may also be assigned a "Dial Phone" property. If a form has a text field with a "Dial Phone" property, then whenever a document is displayed with this form, a "Call" action may be available on the mobile device. The "Call" action may allow the user to dial the phone number contained in this field. If more than one field in a form has the "Dial Phone" property, then the mobile device user may be presented with the available phone number (or other contact information) choices.

Date/Time fields format may be determined from the mobile user's locale settings. Local time zone may also be determined from the mobile user's locale settings and the time may be displayed on the device as local time.

Number fields may support field properties, such as number format (e.g., decimal, percent, currency); decimal places; decimal symbol; thousands separator; currency symbol and other field properties.

Multiple types of forms may be used by the present invention for various applications. Different types of forms may include facsimile, memorandum, invitation, user profile and other applications. Forms for each application may include predetermined form fields that are specific to each application. Forms may be created, modified and forwarded (or sent) to one or more selected recipients. Other operations may also be performed.

For example, forms may be displayed as brief forms and full forms. Other options are also available. For example a full form may display all the fields available while a brief form may display the fields selected (or customized) by the user.

For example, a brief memo view may display a selected portion of a memo, such as the body of the text. If the body field is longer than the screen size, then a portion of the body field may be displayed. Other fields may be selected by the user. A full memo view may include a from field, date field, send to field, copy to field, subject field, body field and other fields. Actions associated with a memo may include reply, delete, fax, forward, switch view and other actions and viewing options.

For example, a brief invitation view may display one or more selected fields or portions of an invitation, such as start date field, end date field, and subject field, for example. Other fields or portions of the invitation may be selected. A full invitation view may include chair field, start date field, end date field, location field, subject field, comments field, body field and other fields. Actions associated with an invitation may include accept, decline, fax, switch view, and other actions and viewing options.

A fax form may include a name prompt; fax number, comment and other fields. A fax menu may include send, cancel, save as draft and other operations. The fax may be sent to one or more recipients selected from an address book, directory or other database.

Privacy features may also be available in wireless access applications of the present invention. For example, a "Prevent Copying" option may be used when composing an e-mail message or other document or correspondence. A message (or document) designated with the "Prevent Copying" option may not be forwarded or faxed. Various privacy options and levels of privacy may be available. For example, if a user selects multiple messages to forward or fax, those messages designated as private may be ignored (e.g., those messages may not be forwarded or faxed). If all selected messages are designated as private, then an error message may be displayed to the user. If a user elects to reply with history to a message designated as private, then the reply may be sent without the contents of the original message. An error message may or may not be given. If a message has a different level of privacy attached to it, then forwarding and reply with history may work normally, but faxing may be prevented. Other levels and forms of privacy may be designated for different messages, documents and applications.

An application designer may create views and folders, through View/Folders module 416, that the end user may use to list documents and other correspondences, for example. Each wireless access application may contain at least one view or folder. A view may contain one or more various components and properties, such as name, view selection formula, default actions, columns and other actions. According to an embodiment of the present invention, application navigation may occur through views and folders where the user may open a selected document from a list of views and folders.

Columns may support properties, such as column value, title, sort order, click on header to sort, multi-value separator, number formats (e.g., general, fixed, currency, percentage, etc.), decimal places, date and time content (e.g., date and time, date only, time only) and other properties. Formatting information for number column values may be determined from a mobile user's local settings, such as decimal symbol, thousands separator, currency symbol and other formatting information. The format for date/time column values may be determined from a mobile user's locale settings. Locale time zone may also be determined from the mobile user's locale settings and time may be displayed on the device as local time. Column contents may be designed so that a maximum of a predetermined number of characters may be display for any column. If necessary, field values used as column content may be truncated.

An application designer may include a Using Database Document with a wireless access application. This may cause an action menu item to be included with each view/folder that may be used to read the Using Database Document. The components allowed in a Using Database Document may be text and bitmap images. Other components may also be available.

A wireless access application may contain default, custom and other actions, which may be accessed through Default and Custom Actions module 418. Default actions may be supported in one or more of forms, views and folders. Custom actions may be supported in forms and subforms. Custom actions may be written using a particular language, such as WML script or other language. For an action to be included in mobile wireless access application, the display property "Include action in Action menu" or similar display property may be selected for the action.

Default actions may support various actions, such as categorize, send document, forward, move to folder, remove from folder and other actions. Categorize action may add one or more categories to the categories field of a document. Send document action may add one or more recipient names to a send to field of a document. Forward action may add one or more recipient names to a send to field of a memo form and add a document to the body field. Move to folder action may add a document to a folder. Remove from folder action may remove a document from a folder.

A wireless access application may contain script in certain contexts, according to an embodiment of the present invention. Various components may be available for scripting, such as form events; custom actions; field defaults, input translation and input validation; computed fields; column values and other components. A subset of @function language ("FL") may be supported as well as LotusScript and WML Scripts ("WMLS"). Other scripts may also be supported.

WML Script may be supported for certain events. In order to access field values, a WML browser and functions may be used. Because the WML syntax for variable names may differ from the syntax for field names, name mapping may be performed according to various predetermined rules.

According to another embodiment of the present invention, a wireless page generator may format the document, view, page (or other information) into an appropriate format for the device. A wireless page generator of the present invention may receive requests for and generate pages of data to be sent to and displayed on a wireless device. A page generator may also encompass a XML to WML translator. For example, the data may be in WML for display on a WAP phone or other mobile device. In another example, it may be data intended for an iMode, HDML or other device. Other applications may be implemented.

Requests for a page of data may come from one or more request handlers. A page of information requested for display on the device may be of several different types. For example, information requested for display may include a document from a database formatted by a form. To create this type of page, the page generator may take the appropriate data from the database and transform the data based on a style sheet specific to the type of device it is to be displayed on.

Also, information requested for display may include a list of documents in a database, selected and formatted by a view or folder. This process may be similar for documents and forms. A list of entries in the view may be obtained from a database, the details of those entries may be read, and the data may then be transformed by a style sheet into the requested (or desired) format.

The page of information requested may also encompass a fixed (or predetermined) pre-generated page of data, such as a database containing a "Using" or "Help" document. The page of information may also include files to be sent to the phone (or other device), for example, a script file required (or requested) by the page on the phone. These may be scripts defined in a form, but in WML they may be sent separately to the phone (or other mobile device). Another example may include an image file.

The page of information requested may also include a user's home page, listing mobile applications a user may be authorized to access and other information. The options available on the user's home page, and the associated URL to open may be stored in a document in an administration or other database. This may be merged with an appropriate Home Page style sheet to create a page specific to the device.

The page of information requested may also include a mobile applications main menu. For example, an e-mail application may offer "read new mail," "create email," etc. Another example may include error messages, such as "error opening database" or "authorization to open database denied." The error message text may be generated from an appropriate resource file. This text may then be transformed by a style sheet into the format required (or requested) by a device (e.g. WML).

A database designer (or other authorized entity) may define one or more mobile applications in a database. According to an embodiment of the present invention, each mobile application may create an "App Digest" in a database. An App Digest may be a design element for a database. Examples of forms may include "e-mail" or "calendar." One function of the App Digest may be to hold information regarding the application and a copy of the design elements used by the mobile application in a format required (or desired) by the mobile service.

Mobile design elements (e.g., document and view style sheets, pre-generated pages and scripts) may be saved in the App Digest as attached files. These mobile design elements may be intended to be derived from equivalent design elements in a database (e.g., forms, views, help, etc.). A compiler may automatically generate these items from forms and views designed by an application designer. Also, style sheets and pages may be hand coded.

A wireless App Digest may contain various attachments with names in a format which may include device type and device model. Files may be in a structured field format containing various design elements (e.g., style sheets, pre-formatted pages, etc.) and associated information (for example, each style sheets may need an associated form name, such as "memo"). If a design element is not found in the appropriate device type/device model file, then the page generator may look in a generic device type file. In this way, if there are significant differences between devices of the same type, the relevant style sheet may be included in each of the files whereas if each model behaves the same (or similarly), a single style sheet may be put in a generic device type file.

If a request handler requests a pre-generated page or a script, the appropriate page of data may be read from the App Digest and returned to the request handler. If a request handler requests a document, a view or any other page that may be formatted by a style sheet, the page generator may obtain and merge information from the sources. Thus, the values of the fields in the document may be read and formatted on a screen according to the layout specified in the form. The wireless page generator may format the document, view, page (or other information) into an appropriate format for the device.

Figure 10:
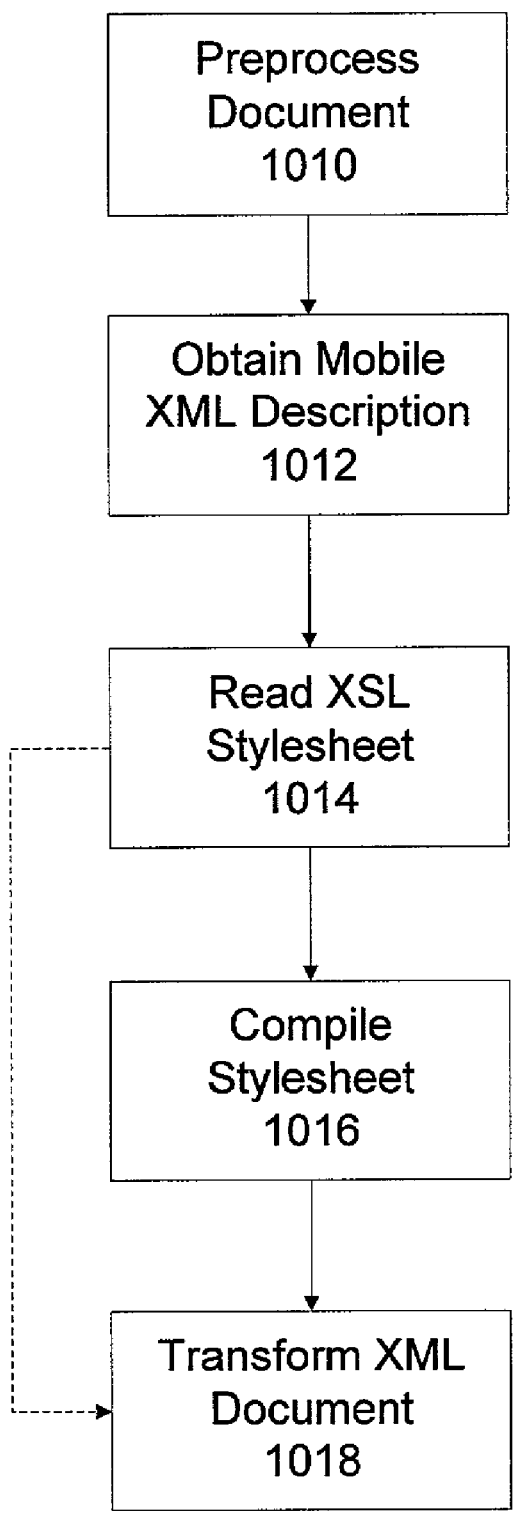
FIG. 10 is a flowchart of a process for formatting a document in an appropriate format for a device, according to an embodiment of the present invention.
Figure 11:
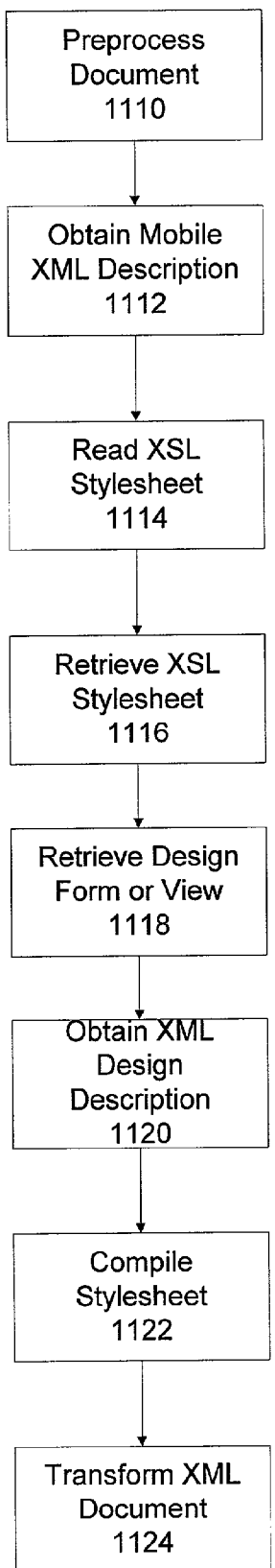
FIG. 11 is a flowchart of a method for formatting a document in an appropriate format for a mobile device according to an embodiment of the present invention.

FIG. 10 illustrates a process for formatting a document (or other page of data) in an appropriate format for a device, according to an embodiment of the present invention. At step 1010, the document may be pre-processed to replace one or more elements that may not be able to be displayed or otherwise hindered (e.g., encrypted fields or file attachments), which may include text indicating what has been removed (or altered). Also, data types that may not be able to be represented on a device (e.g., date/time fields) may be converted into text. For example, date/time fields may be replaced with text giving the date in the user's local time zone, which may be formatted according to date/time zone preferences. In another example, fields may be truncated that have been marked in the design as being truncatable, to a maximum mobile size. Fields that have not been marked as truncatable may be tested for size based on the maximum size of WML the device may accept. Also, the size the style sheet can be without this data may also be considered. stylesheet using an XSLT processor and return the resulting page of data to a request handler or other authorized entity or unit.

For further improvement, the design elements of an application may be cached by the page generator, since these items may not change frequently. In the case of style sheets, the compiled style sheet may be cached. In addition to the design elements required (or desired) for a particular application, there may also be a number of common design elements required (or desired) by the mobile service. These may be stored in a mobile application form in an administrative (or other) database. Design elements included in this application may include a style sheet to build an error message to send to a device and a style sheet to build a home page. Other design elements may also be designated as such.

Multiple mobile device types may be supported through the present invention. According to an embodiment of the present invention, a generic output may be provided where the specifics related to the receiving mobile device may be irrelevant. For example, regardless of the model, type or series number of the mobile device being used, information sent to the mobile device may be viewed properly. Further the information may be customizable by the user.

Mobile device users may customize various aspects of views and applications, through Customization module 420. Examples of customizable options may include home page (e.g., personal, any URL), time zone, date format, font format, language and other options. This feature of the invention provides for international applications. For example, a user may receive a message in French from a client in France or other location. The text message in French may be accepted by a mobile device and displayed in French or English (or other selected language). The data transmitted may be formatted to display an identified time zone, date format and other features and characteristics for customized viewing options.

A server form in a directory of the present invention may contain a subform that allows server level configuration information to be administered. The subform may contain various tabs, such as Basics tab, Wireless Access tab and Wireless Security tab. Basics tab may contain server settings which may be common to various applications and products. The Wireless Access tab and the Wireless Security tab may contain server settings specific to a wireless product.

Server locale information may be used when sending date, time and currency information to a wireless device. However, the time zone information, the date format and other information may be over-ridden by a user via the wireless user settings in an appropriate form, e.g., Person form.

The Person form in a directory may contain a subform that allows wireless user settings to be administered. Wireless user settings may be optional. For example, wireless user settings related to time may be administered by a user from a wireless device.

According to another embodiment of the present invention, a wireless servlet may use an attachment to a user's Person document to define and save application specific preferences, such as mobile form preferences, search key values and other preferences. This attachment may be similar to a web "cookie" and may contain information that may not be directly administered at the server. For example, a user may submit a search or series of searches in an application (e.g., e-mail or calendar). The user may enter search criteria, which may include search terms, strings of characters and other information in a search form. This search criteria may be saved in a file, as an attachment, for example. Also, the search criteria may be stored on a client side device, such as the mobile device. When a subsequent search is conducted, the previous searches may be accessed and/or retrieved. This feature of the present invention may facilitate searching techniques by the user.

A wireless user home page form may be used to configure an initial menu for a user when accessing a wireless servlet. A default home page document may also be available. Each user home page entry may include various types. For example, a wireless request may be sent to a current wireless server, a URL to any web page, or a submenu for more home page entries. Other options may be available. If a user's home page has a single request or URL menu item, then that item may be executed.

An application designer may design an application user profile form. The application user profile form may enable the user to choose the form to be used when viewing or editing documents (or other information) on a mobile device. Also, application user profile form may enable the user to choose a default view to be used when viewing documents (or other information) on the mobile device. Application user profile form may also enable the user to manage and choose words or phrases for fields in a form.

The user may select the form to be used on a mobile device when reading or editing documents. The user may select a mobile form for each application form that is used. For example, if an application has a Sales form, the application designer may create two mobile versions of this form called MobileSales and BriefSales, both with alias Sales. The user may choose either MobileSales or BriefSales as the form to use for reading Sales documents on the mobile device. If the application has another form, then the application designer may create multiple mobile versions of that form and the user may also choose which to use for reading or editing documents of that type. Other options and variations may also be implemented.

The user may select a default view to be used on the mobile device when reading documents and performing other operations.

If the application designer adds text fields to the user profile form with the same (or similar) field names as fields in the wireless access application form, then the user may add a list of names, words or phrases which may then be selected on the mobile device as values for corresponding fields. This may be similar to a keyword field type in a form. Further, the user may modify the list. For example, for an e-mail application, the user profile form may contain a text field with the name Subject. The user may then add phrases such as "Sales Status," "Just saying hello," "Can we meet?" to this field and those phrases may become choices for the content of the Subject field in a Memo (or other) form when sending an e-mail (or other document) from a mobile device.

An application designer may design an application search form. If an application has a search form, then users may have the option to search (as well as open and perform other operations to) the application from their home page or other environment. If a user chooses to search an application, then the search form may be opened for editing on a mobile device where the user may submit various search settings. The search form may be a profile form and each user may have a profile document containing the last or previous search settings used, as well as other information.

A search form may contain a formula field where the field may contain a select formula that may be evaluated on the server for the search operation. This formula typically may reference other fields on the search form. For example, a designer may add a From field on an e-mail application search form so that the user may search for e-mail from a particular person or group. Also, a search form may optionally contain a field that may contain a view or folder name which may be used to further constrain the search to documents in a specified view or folder. Other specifications may be defined and other criteria may be applied.

According to another embodiment of the present invention, text-to-speech capability may be provided. Thus, any information in the form of text received by a mobile device may be converted to speech.

The features of the present invention may be applied to a financial services example. However, it may be understood that the present invention may be applied to various applications. This following example of financial services is presented as a mere example of the present invention. A financial planner (or user) or other entity doing business in the financial field may have various stocks to manage. The financial planner of this example may have set buy and sell thresholds for each stock. Timing is critical and a delayed buy or sell may mean a difference of hundreds of thousands to various clients. However, the financial planner may not be able to constantly monitor the market. Through the present invention, any time the price reaches an upper or lower threshold, the present invention may notify mobile services and using a short messaging or other services a short message may be sent to the financial planner where a mobile device (e.g., pager, mobile phone) may alert the financial planner. However, the financial planner may be in a situation where immediate action may not be possible. For example, the financial planner may be in a meeting, in an airplane or otherwise unable to react to the message. Through the present invention, the financial planner may have programmed the mobile device (e.g., pager) so that with a single press of a button, the financial planner may direct a message to a broker (or other entity). If the financial planner is notified that one of the stocks has reached the critical point, the financial planner may simply pick a reply (e.g., sell, buy, hold) and forward the message to the broker (or other selected recipient) without having to leave a meeting or make a call.

The method and system of the present invention may be implemented through various communication environments, such as a Wireless Application Protocol, Bluetooth protocol, Global System Mobile protocol, Wireless Markup Language protocol and other wireless communication protocols. Bluetooth wireless communications technology provides the ability to exchange data and voice between communication devices. Bluetooth may include a radio-based standard for small personal devices to automatically connect and exchange information for personal wireless applications. Bluetooth may further include a short-range networking protocol for connecting different types of devices, such as mobile phone, desktop or notebook computers. Bluetooth may enable access to the Internet via a phone's mobile data system and linking the user's voice to a computer. Devices that are Bluetooth enabled may communicate by wireless signals within a defined range where a line-of-sight connection is not needed. For example, Bluetooth technology may transfer an e-mail from a user's mobile phone to a personal computer for easier reading and reply.

Bluetooth may enable the creation and use of a wireless personal area network (WPANs) where a WPAN may connect devices to establish data communications channels for applications. The WPAN may form a network for a single individual and that person's interactions with personal digital devices. Bluetooth may be a packet-based communications medium and may accommodate both data and voice transmissions.

The foregoing description of a system and method for providing customizable options on a wireless device is illustrative, and changes in the above construction and sequences of operation may occur to persons skilled in the art. For example, although multiple modules are shown for carrying out the invention, additional or fewer modules may be used and multiple modules may be positioned in various locations. Additionally, although the invention is intended to be practiced with Lotus®, Notes® applications, the invention may be practiced with various applications because the invention uses XML to represent data and design. It should be noted, however, that the invention is not limited to XML and may be practiced using another language. Other embodiments, uses and advantages of the present invention will be apparent to those skilled in the art from consideration of the specification and practice of the invention disclosed herein. The specification and examples should be considered exemplary only. The scope of the invention is accordingly intended to be limited only by the following claims.

What is claimed is:

1. A method of operating a search application via networkable media in a wireless client device, comprising the steps of:
    storing at least one form associated with the search application, wherein the at least one form is stored remotely from the wireless client device;
    storing a style sheet associated with the wireless client device, wherein the style sheet is stored remotely from the wireless client device;
    accessing the search application, wherein the search application includes one or more options;
    selecting at least one option on the wireless client device from the one or more options included in the search application;
    receiving, via a wireless medium, the selected option from the wireless client device;
    using the search application remotely from the wireless client device to execute an action that corresponds to the selected option, wherein executing the action includes generating content;
    accessing a form from the stored at least one form, wherein the accessed form is associated with the selected option;
    accessing a style sheet associated with the wireless client device;
    generating a mobile design element based on the accessed form and the style sheet associated with the wireless client device;
    formatting the content according to the mobile design element;
    transmitting the formatted content to the wireless client device via the wireless medium; and
    storing the mobile design element remotely from the wireless client device.

2. The method of claim 1, wherein the selected option comprises at least one of a form use option, a view customization option, a short cut option, a sort option, an edit search option, a store option, or an edit form option.

3. The method of claim 1, wherein the wireless medium comprises at least one of a Bluetooth protocol, a Wireless Application protocol, a Global System Mobile protocol, or a Wireless Markup Language protocol.

4. The method of claim 1, wherein the mobile design element comprises at least one of a document style sheet, a view style sheet, a pre-formatted page, or a script.

5. The method of claim 1, further comprising customizing one of the at least one forms according to settings selected on the wireless client device.

6. The method of claim 1, wherein the style sheet associated with the wireless client device is based on a profile of the wireless client device.

7. The method of claim 1, further comprising customizing one of the at least one forms based on at least one of a date/time setting, a language setting, a field size setting, a content size setting, or a mobile design element setting.

8. A system for operating a search application via networkable media in a wireless client device, comprising:
    a storage unit that comprises:
        a database that stores at least one form associated with the search application that includes one or more options, wherein the database is located remotely from the wireless client device, and an application digest that stores a style sheet associated with the wireless client device, wherein the application digest is located remotely from the wireless client device;

an input interface to accept an option on the wireless client device;

a processor unit, that receives the option from the input interface, accesses the search application, associates a form from the stored at least one form with the option, and uses the search application to execute an action that corresponds to the at least one option, wherein executing the action includes generating content; and a compiler that access the form associated with the option, accesses the style sheet associated with the wireless client device, and generates a mobile design element based on the accessed form and the style sheet, wherein the content is formatted according to the mobile design element and is transmitted to the wireless client device via a wireless medium, and wherein the generated mobile design element is stored in the application digest.

9. The system of claim 8, wherein the option comprises at least one of a form use option, a view customization option, a short cut option, a sort option, an edit search option, a store option, or an edit form option.

10. The system of claim 8, wherein the wireless medium content comprises communicating via at least one of a Bluetooth protocol, a Wireless Application protocol, a Global System Mobile protocol, or a Wireless Markup Language protocol.

11. The system of claim 8, wherein the mobile design element comprises at least one of a document style sheet, a view style sheet, a pre-formatted page, or a script.

12. The system of claim 8, wherein the form associated with the action is customized according to settings selected on the wireless client device.

13. The system of claim 8, wherein the style sheet associated with the wireless client device is based on a profile of the wireless client device.

14. The system of claim 8, wherein the form associated with the action is customized based on at least one of a date/time setting a language setting, a field size setting, a content size setting, or a mobile design element size setting.

15. A system for operating a search application via networkable media in a wireless client device, comprising:
    storage means comprising:
        database means for storing at least one form associated with the search application that includes one or more options, wherein the database means are located remotely from the wireless client device, and
        element storage means for storing a style sheet associated with the wireless client device, wherein the element storage means are located remotely from the wireless client device;
    input interface means for accepting an option on the wireless client device;
    processor means, for receiving the option from the input interface, accessing the search application, associating a form from the stored at least one form with the option, and using the search application to execute an action that corresponds to the at least one option, wherein executing the action includes generating content; and
    compiler means for accessing the form associated with the option, accessing the style sheet associated with the wireless client device, and generating a mobile design element based on the accessed form and the style sheet,
    wherein the content is formatted according to the mobile design element and is transmitted to the wireless client device via a wireless medium, and
    wherein the generated mobile design element is stored in the element storage means.

16. The system of claim 15, wherein the option comprises at least one of a form use option, a view customization option, a short cut option, a sort option, an edit search option, a store option, or an edit form option.

17. The system of claim 15, wherein the receiving transmissable media content comprises communicating via at least one of a Bluetooth protocol, a Wireless Application protocol, a Global System Mobile protocol, or a Wireless Markup Language protocol.

18. The system of claim 15, wherein the mobile design element comprises at least one of a document style sheet, a view style sheet, a pre-formatted page, or a script.

19. The system of claim 15, wherein the form associated with the action is customized according to settings selected on the wireless client device.

20. The system of claim 15, wherein the style sheet associated with the wireless client device is based on a profile of the wireless client device.

21. The system of claim 15, wherein the form associated with the action is customized based on at least one of a date/time setting a language setting, a field size setting, a content size setting, or a mobile design element size setting.

22. A storage medium for storing machine readable code, the machine readable code being executable to operate a search application via networkable media in a wireless client device, the storage medium comprising:
    storing code that comprises:
        form storing code that stores at least one form associated with the search application, wherein the at least one form is stored remotely from the wireless client device, and
        style sheet storing code that stores a style sheet associated with the wireless client device, wherein the style sheet is stored remotely from the wireless client device;
    accessing code that accesses the search application, wherein the search application includes one or more options;
    selecting code that selects at least one option on the wireless client device from the one or more options included in the search application;
    executing code that uses the search application remotely from the wireless client device to execute an action that corresponds to the selected option, wherein executing the action includes generating content;
    accessing code that accesses a form from the stored at least one form, wherein the accessed form is associated with the selected option;
    accessing code that accesses a style sheet associated with the wireless client device;
    generating code that generates a mobile design element based on the accessed form and the style sheet associated with the wireless client device;
    formatting code that formats the content according to the mobile design element;
    transmitting code that transmits the formatted content to the wireless client device via the wireless medium; and
    storing code that stores the mobile design element remotely from the wireless client device.

23. The storage medium of claim 22, wherein the selected option comprises at least one of a form use option, a view customization option, a short cut option, a sort option, an edit search option, a store option, or an edit form option.

24. The storage medium of claim 22, wherein the wireless medium comprises at least one of a Bluetooth protocol, a Wireless Application protocol, a Global System Mobile protocol, or a Wireless Markup Language protocol.

25. The storage medium of claim 22, wherein the mobile design element comprises at least one of a document style sheet, a view style sheet, a pre-formatted page, or a script.

26. The storage medium of claim 22, further comprising customizing code that customizes one of the at least one forms according to settings selected on the wireless client device.

27. The storage medium of claim 22, wherein the style sheet associated with the wireless client device is based on a profile of the wireless client device.

28. The storage medium of claim 23, further comprising customizing code that customizes one of the at least one forms based on at least one of a date/time setting, a language setting, a field size setting, a content size setting, or a mobile design element setting.

* * * * *